United States Patent Office.

THOMAS SHEEHAN, OF DUNKIRK, NEW YORK

Letters Patent No. 65,512, dated June 4, 1867.

IMPROVED COMPOSITION FOR CONVERTING IRON INTO STEEL.

*The Schedule referred to in these Letters Patent and making part of the same.*

TO ALL WHOM IT MAY CONCERN:

Be it known that I, THOMAS SHEEHAN, of Dunkirk, in the State of New York, have invented or discovered a certain new and useful improvement in the Preparation of a Composition for Converting Wrought Iron into Steel; and I do hereby declare that the description given in my former patent, dated September 4, 1860, and numbered 29,919, setting forth the ingredients used, and the proportions thereof, is clear and explicit.

My invention or discovery now consists in the saturation of the liquid composition described in my former patent with carbonic acid gas.

The manner in which I prefer to do this is as follows: During the time that the gas is passing from the retort into the barrel of liquid, I take about three gallons of lye, and pour it, in a small stream, into said barrel, thus enabling the gas to be more thoroughly absorbed by the agitation of the liquid composition.

I would here observe that the advantages arising from the saturation of the liquid composition with carbonic acid gas are as follows:

Instead of using the quantity of lye mentioned in my old patent, I use only three (3) gallons in the way just referred to, and thirty-eight (38) gallons of pure water, for making forty-four (44) gallons of the composition, which, in consequence thereof, is made much cheaper, and answers the purpose just as well as when a greater quantity of lye and no water was used.

I would observe further that the residue which remains in the box, (see former patent,) after hardening a batch of work, I save and mix with fresh composition, when it is again as good as before.

What I claim, and desire to secure by Letters Patent, is—

The saturation of the liquid composition described in my former patent with carbonic acid gas, substantially for the purpose set forth.

In testimony whereof I herewith affix my signature in presence of two witnesses.

THOMAS SHEEHAN.

Witnesses:
  WM. BOOKSTAVER,
  F. F. DRIGGS.